No. 830,217. PATENTED SEPT. 4, 1906.
J. C. FREDELL.
ELECTRICALLY CONTROLLED OPTICAL APPLIANCE.
APPLICATION FILED AUG. 25, 1905.

2 SHEETS—SHEET 1.

Witnesses:
George Oltsch
G. M. Cole

John C. Fredell
Inventor.
By Theodore Dalton
Atty.

No. 830,217. PATENTED SEPT. 4, 1906.
J. C. FREDELL.
ELECTRICALLY CONTROLLED OPTICAL APPLIANCE.
APPLICATION FILED AUG. 25, 1905.
2 SHEETS—SHEET 2.
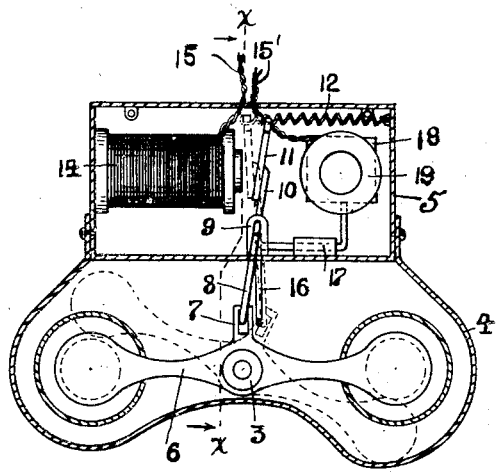
Fig. 3.
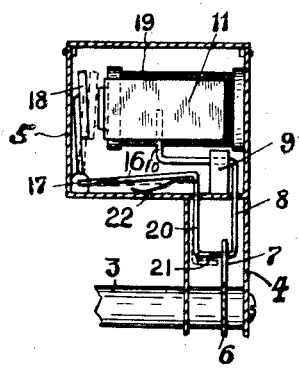
Fig. 4.
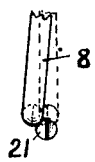
Fig. 5.
Fig. 6.
Witnesses:
George Altach
G. M. Cole.
John C. Fredell.
Inventor
By Theodore Dalton
Atty.

UNITED STATES PATENT OFFICE.

JOHN C. FREDELL, OF POCATELLO, IDAHO.

ELECTRICALLY-CONTROLLED OPTICAL APPLIANCE.

No. 830,217.  Specification of Letters Patent.  Patented Sept. 4, 1906.

Application filed August 25, 1905. Serial No. 275,789.

*To all whom it may concern:*

Be it known that I, JOHN C. FREDELL, a citizen of the United States, residing at Pocatello, in the county of Bannock and State of Idaho, have invented new and useful Improvements in Electrically-Controlled Optical Appliances, of which the following is a specification.

This invention relates to an electrically-controlled optical appliance, such as a spy-glass, opera-glass, or other similar device; and the object is to electrically operate and control a shutter, so that a sight through the lens-tube may be obtained for a predetermined period.

The invention further has for its object to economize in electrical energy, and to this end the construction includes a shutter-operating mechanism that is momentarily energized to open the shutter and a locking mechanism which holds the shutter open for a certain period and which is momentarily energized at the end of said period to release the shutter, wherefore there will be no expenditure of electrical energy during the use of the instrument.

For a full understanding of the construction and merits of my invention reference is to be had to the following description and to the accompanying drawings, in which—

Figure 1:
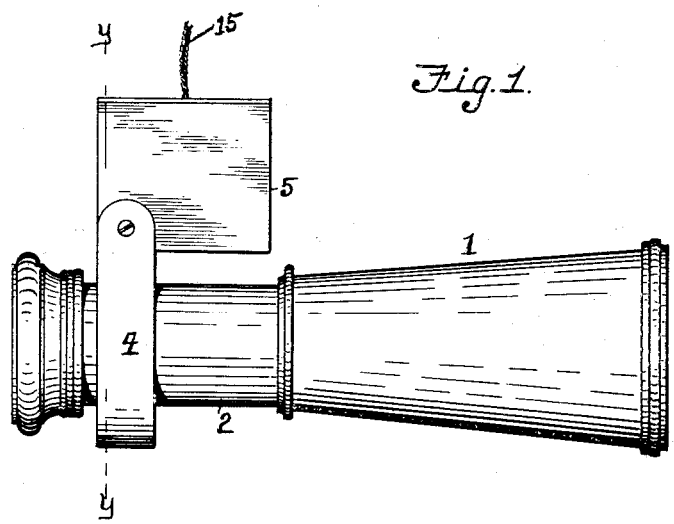
Figure 2:
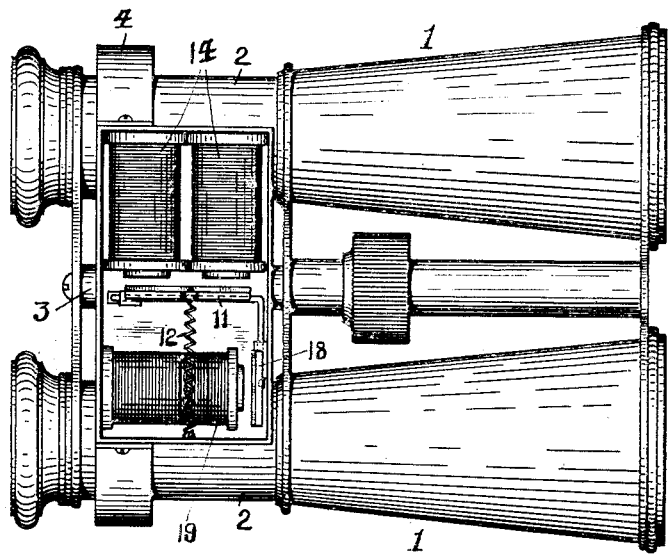

Figure 1 is a side elevation of the appliance. Fig. 2 is a plan view with the top of the case containing the electrical mechanism removed. Fig. 3 is a transverse section on the line $y\,y$ of Fig. 1. Fig. 4 is a vertical section on the line $x\,x$ of Fig. 3. Fig. 5 is an enlarged detail view, in end elevation, of the shutter-operating levers; and Fig. 6 is a side elevation of the same.

In carrying out the invention, any suitable optical instrument may be employed, and in the present drawings the same is shown as consisting of an opera-glass having the barrels 1, in which the lens-tubes 2 telescope in the usual manner, there being the usual adjusting-rod 3. The lens-tubes are partially inclosed by a suitable case 4, to the top of which is attached a box 5, that contains the operating mechanism for the shutter.

The shutter 6 is fulcrumed on the adjusting-rod 3, and when the appliance is not in use each end of the shutter lies within the focus of the lenses, as shown in full lines in Fig. 3, so as to obstruct the view therethrough. At a point above the fulcrum of the shutter the latter is provided with a slotted arm 7, in which the end of an operating-lever 8 plays. This lever is fulcrumed in a post 9 in the box 5 and has an upwardly-extending arm 10, to which an armature 11 is secured. A coil-spring 12, having one end secured to the top of the armature and its other end secured to the side of the box, tends to normally hold the armature away from its magnet and the lower end of the lever projected in an opposite direction, so as to hold the shutter in the lens-tubes, as shown in full lines in Fig. 3.

A solenoid 14, mounted in one end of the box 5, serves to attract the armature 11 when a current of electricity is caused to pass through the coil of the solenoid, which is shown in Fig. 3 as having the positive and negative conductors 15 extended through the top of the box. The circuit is closed by any suitable coin-controlled mechanism with which the present invention may be associated, and the solenoid is only energized momentarily or long enough to attract its armature, which throws the shutter to the open position, as shown in dotted lines in Fig. 3.

The shutter-operating lever has associated therewith a locking mechanism, which consists of a lever 16, pivoted in a post 17 in one end of the box and having on its upper end an armature 18, which is adapted to be controlled by a solenoid 19, having conductors 15' extending through the top of the box. This locking-lever extends forwardly from its pivot and then downwardly through the bottom of the box, as at 20, and has its end 21 terminated adjacent to the end of the shutter-operating lever, so that when the latter swings on its pivot its end will engage the end of the locking-lever, forcing it downward against the tension of a spring 22, which bears against the bottom of the box. As the shutter-operating lever rides past and over the locking-lever the spring 22 will return the locking-lever to its normal position, which position is in the path of the end of the shutter-lever, and it will hold the latter locked and the shutter open until the locking-lever is again depressed. The release of the shutter-lever takes place at the end of a predetermined period, when the solenoid 19 becomes energized by a further operation of the coin-controlled mechanism, (not shown,) and at such time the armature 18 is attracted by the solenoid 19 and the lever 16 swung on its pivot, compressing the spring 22 and lowering the end 21 of the locking-lever to a position shown in dotted lines in Fig. 4 and in full lines in Fig. 5. As soon as this releasing action takes place the spring 12 immediately draws the armature of the shutter-lever 8 away from its solenoid and restores the shutter to a closed position. In order that the ends of the two levers may be securely locked, their contiguous faces are flattened, as at 23 in Fig. 6, and thus they are not liable to be dislodged by jar.

In Fig. 5 the full lines represent the positions of the two levers when the shutter is open, the shutter-lever 8 having passed over the end of the locking-lever, and the dotted lines represent the position of the locking-lever after the shutter-lever has passed over it, the said locking-lever having moved upwardly in the path of the shutter-lever. The dotted-line position of the locking-lever in Fig. 4 represents the position of the lever when acted upon by the solenoid 19, the end 21 thereof being beneath the end of the shutter-lever to permit the latter to return to its normal position.

It will be seen that a constant current is not required to hold the shutter open or closed, as a momentary energizing of the solenoid 14 will open the shutter which is automatically locked, and a momentary energizing of the solenoid 19 will release the lock, thus effecting a considerable saving in the life of the battery, and consequently reducing the operating expenses.

Having thus described my invention, what I claim, and desire to secure by Letters Patent, is—

1. In an electrical optical appliance of the class described, a lens-tub, a shutter for controlling the opening through the lens-tube, means for opening the shutter, means operating automatically to engage the shutter-opening means for locking the shutter in open position for a predetermined period, means operating upon said automatic locking-means for releasing the shutter-opening means at the end of said period, and means for closing the shutter.

2. In an electrically-controlled optical appliance, a lens-tube, a shutter for controlling the opening through the lens-tube, a lever connected with the shutter for moving it out of the lens-tube, a second lever disposed within the path of the first-mentioned lever and adapted to engage the latter and hold it with the shutter for a predetermined period in the position to which it has been moved, means to operate upon the said second lever to release it from engagement with the first-mentioned lever and means for restoring the first-mentioned lever to its normal position in the lens-tube.

3. In an electrically-controlled optical appliance, the combination of a lens-tube, a shutter for controlling the opening in the lens-tube, and instrumentalities including momentarily-energized solenoids, one of which effects the opening of the shutter and the other of which releases the shutter at the end of a predetermined period, and means for automatically locking the shutter in open position during said period.

4. In an electrically-controlled optical appliance, a lens-tube, a shutter for controlling the opening through the lens-tube, a solenoid having an armature, a lever secured to said armature and engaged with the shutter, whereby the shutter is opened when the solenoid is energized, a second lever disposed within the path of the first-mentioned lever and adapted to lock the latter against movement when the shutter is opened, and a solenoid for operating upon the said second lever to release the shutter-operating lever.

5. In an electrically-controlled optical appliance, a barrel, a lens-tube, an adjusting-rod for the lens-tube, a shutter fulcrumed upon said rod, a lever having one end engaged with the shutter and having an armature on its other end, a solenoid for operating said armature to open the shutter, a locking-lever normally held within the path of the shutter-operating lever and adapted to be engaged by the latter to hold the shutter in an open position, an armature on one end of the locking-lever, a solenoid for operating upon said armature to release the locking-lever from engagement with the shutter-operating lever, and a spring secured to the armature of the shutter-operating lever for restoring the shutter to closed position, substantially as specified.

In testimony whereof I affix my signature in presence of two subscribing witnesses.

JOHN C. FREDELL.

Witnesses:
GEORGE OLTSCH,
G. M. COLE.